United States Patent [19]

Fischer et al.

[11] Patent Number: 5,174,652
[45] Date of Patent: Dec. 29, 1992

[54] AIR INTAKE SUPRESSOR

[75] Inventors: James Fischer, Wauwatosa, Wis.;
Tore Strandberg, Nacka, Sweden

[73] Assignee: ITT Flygt AB, Solna, Sweden

[21] Appl. No.: 766,236

[22] Filed: Sep. 24, 1991

[30] Foreign Application Priority Data

Sep. 25, 1990 [SE] Sweden ............................. 9003035

[51] Int. Cl.⁵ ............................................. B01F 15/00
[52] U.S. Cl. .................................. 366/270; 366/349;
415/8
[58] Field of Search ............... 366/262, 270, 285, 342,
366/343, 349; 415/3.1, 7, 8

[56] References Cited

U.S. PATENT DOCUMENTS

| 1,226,400 | 5/1917 | Smith | 415/8 |
|---|---|---|---|
| 2,078,179 | 4/1937 | Johnson | 415/8 |
| 4,240,990 | 12/1980 | Inhofer | 415/8 |
| 4,431,597 | 2/1984 | Cramer | 366/285 |
| 4,671,872 | 6/1987 | Cramer | 366/285 |

FOREIGN PATENT DOCUMENTS 0367664 5/1990 France ............................. 366/342

Primary Examiner—Philip R. Coe
Assistant Examiner—Randall Edward Chin
Attorney, Agent, or Firm—Menotti J. Lombardi

[57] ABSTRACT

A mixer (1) is provided with a cover (6) on its upside for diminishing the risk for air intake when the mixer operates near a liquid surface (10).

3 Claims, 2 Drawing Sheets

AIR INTAKE SUPRESSOR

BACKGROUND OF THE INVENTION

The invention concerns a device to limit the amount of air intake into a rotating mixer operating beneath a liquid surface.

Mixers of this type are used for instance in waste water and in various types of industrial process liquids to maintain a homogeneous mixture and to prevent sedimentation. The mixer is then placed at a distance below the liquid surface directed so that a flow suitable for the mixing vessel is obtained.

The submersible mixer is in common use today. This mixer is comprised of a hydraulic part having a propeller and an attached driving unit. The big advantage with such a mixer is that it is easier to place the mixer advantageously as there is no long shaft connected to a driving unit outside the tank.

When operating in shallow tanks where the mixer must be placed near the liquid surface, specific problems arise. The draw that arises around the mixer means that there is a risk for air intake from the liquid surface. This air intake means a worse efficiency and in addition there is a risk for vibration in the mixer which disturbs the flow and causes mechanical strain in the material. These problems occur mainly if the mixer is situated within or near the liquid surface.

In order to solve the problems it has been suggested to arrange a floating cover on the surface above the mixer.

Such a cover can be useful, but the fact that the liquid level often changes means that the result often is insufficient.

According to the invention, the problem to reduce the risk for air intake to a rotating mixer is solved by the disclosed device.

SUMMARY OF THE INVENTION

An object of the invention is to provide a device to limit the amount of air intake into a rotating mixer operating beneath a liquid surface.

According to the broader aspects of the invention, a mixer is provided with a cover on its upside for reducing the risk for air intake when the mixer operates near a liquid surface.

BRIEF DESCRIPTION OF THE DRAWINGS

Other objects and advantages of the invention will become more apparent from the following detailed description, claims, and drawings in which:

DETAILED DESCRIPTION OF THE PREFERRED EMBODIMENT

Figure 2:
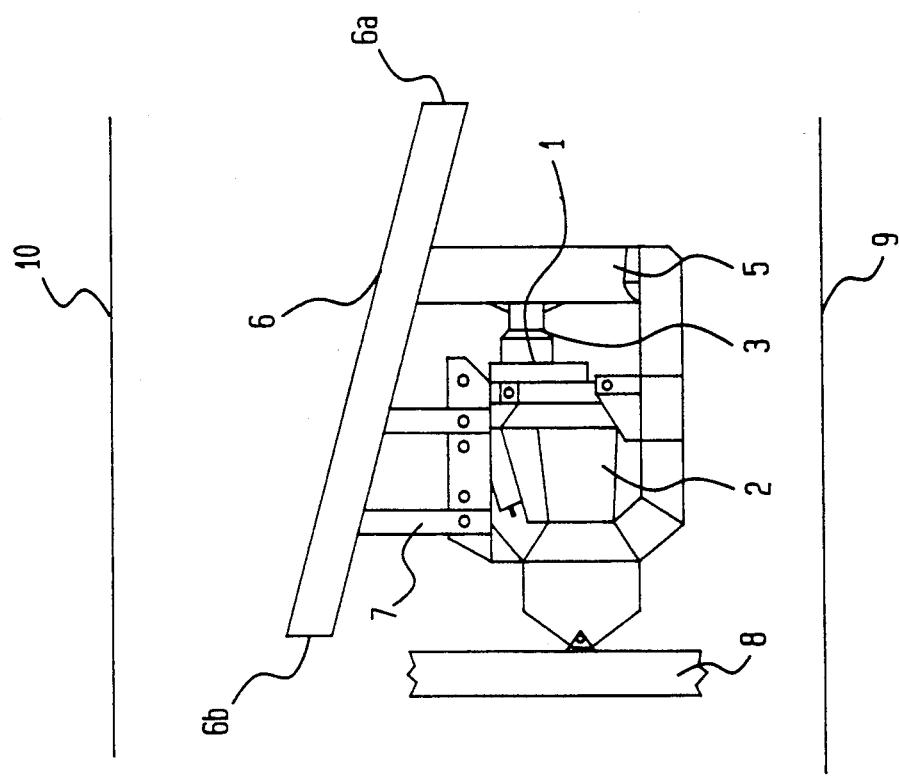
FIGS. 1 and 2 show respectively a frontal and side view of the device with a curved cover according to the invention.

Referring to the drawings, there is shown a submersible mixer 1 having an electric motor 2, a shaft 3, and propeller 4. Also shown is a propeller shroud 5, a curved cover 6, a sliding bracket frame 7 to guide the mixer up and down, a guide mount and bar 8, the tank bottom 9, and the liquid surface 10.

The mixer 1 which preferably is arranged horizontally, constitutes a single unit which may be moved vertically along a guide. The distance between the mixer and the tank bottom 9 is not allowed to be too short to secure a good result and therefore the problem of too short a distance between the mixer and the liquid surface 10 often arises.

According to the invention, a cover 6 is arranged below the liquid surface 10 just above the mixer. The cover is so designed that its front edge 6a is situated 0.5–0.7 times the propeller diameter ahead of the propeller 4 area, while its back edge 6b is situated about twice the propeller diameter behind the area of the propeller.

The width of the cover is about twice the propeller diameter. These measures are approximate and may vary in dependance of the type of liquid, the distance to the liquid level, etc.

The cover 6 should be arranged as near the propeller 4 or its jetring 5 as possible without considerably limiting the inlet area and is according to first embodiment, in parallel with the driving shaft 3 (horizontally). According to a preferred embodiment, the cover 6 is inclined 5 to 15 degrees, preferably 8 to 12 degrees with regard to the horizontal plane. This gives a better efficiency as the cover then represents less hinderance for the flow. In spite of that, there is very little risk for air intake even if the water level goes down even to the upper portion adjacent the back edge 6b of the cover.

The rotation of the propeller creates an under pressure around the propeller and motor which causes air to be sucked down from the surface. The cover prevents the air from being sucked down whether the cover is situated at the surface or completely below it. The distance between the mixer cover and the surface is dependent on the depth of the water, the less depth available, the greater the risk of air being sucked down by the propeller action. The preferred angles mentioned above aid in preventing the choking of water flow into the propeller. The smaller the angle, the more the inflow is choked, which, in turn, increases the water velocity and thus the risk of air being sucked down.

Figure 1:
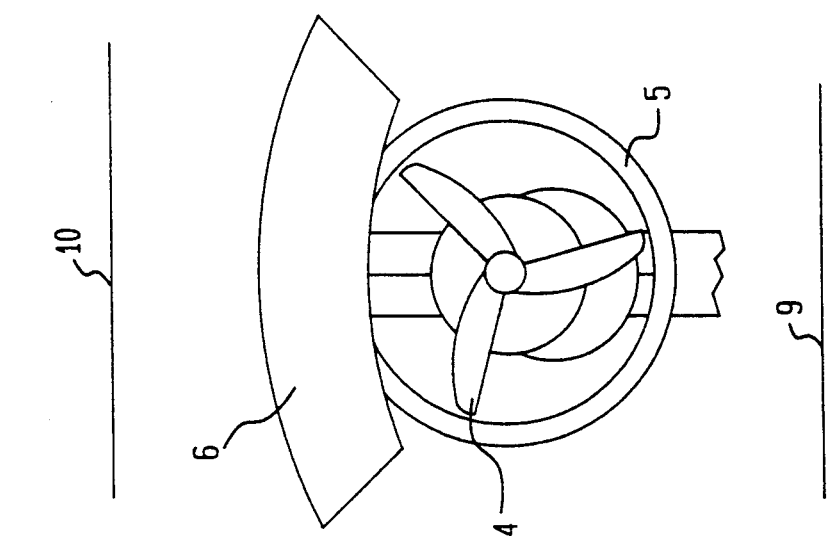
Figure 4:
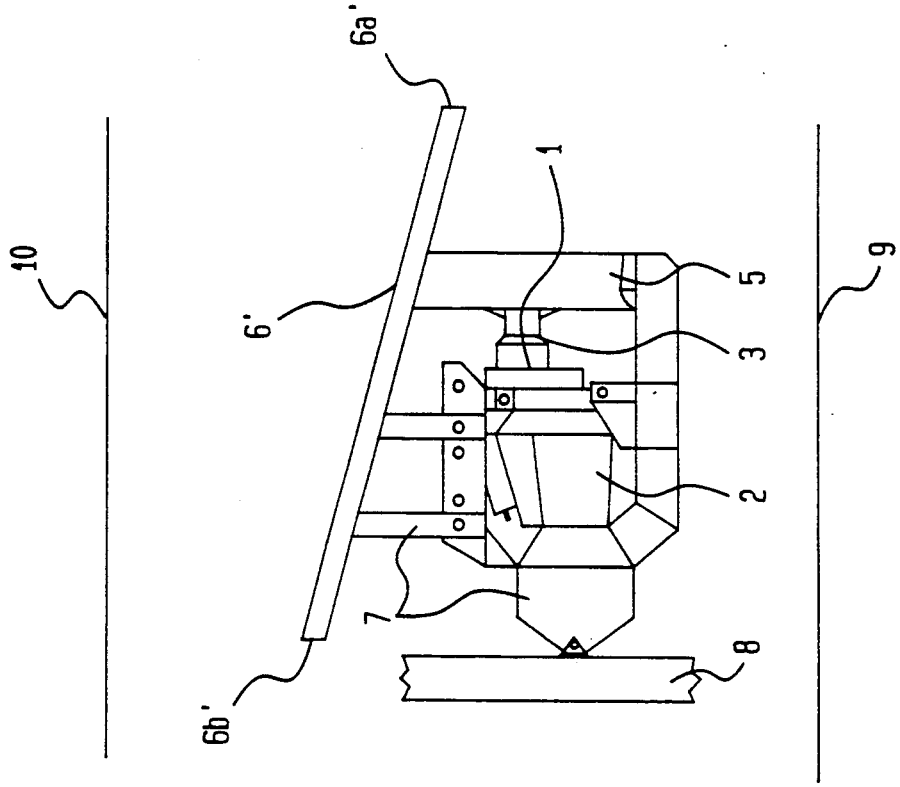
FIGS. 3 and 4 show respectively a frontal and side view of the device with a planar cover according to the invention.
Figure 3:
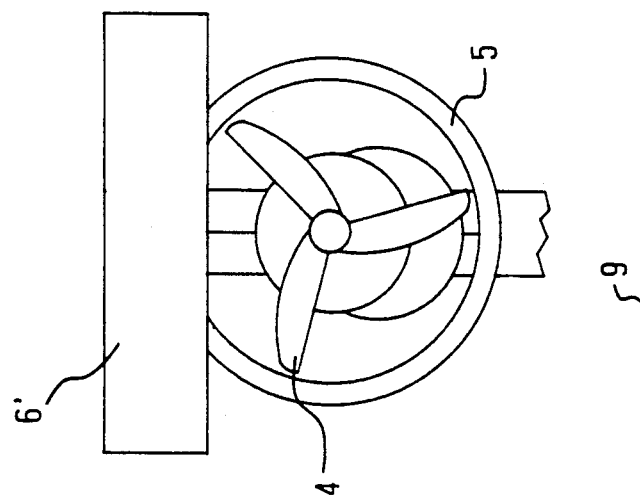

While a curved cover as shown in FIGS. 1 and 2 is preferred if the mixer is normally operating near the surface to prevent waves from bringing air below the cover, a planar cover may also be utilized. Such a planar cover is shown in FIGS. 3 and 4, the planar cover 6' has a front edge 6a' and a back edge 6b'. The remaining reference numbers are the same as described in connection with FIGS. 1 and 2.

The great advantage with the invention is thus that the cover is mounted on the mixer which means that it is always placed correctly, independent of where the mixer is operating. In addition the inclination of the cover according to the preferred embodiment that a good efficiency is maintained and that the risk for air intake is minimized even when the mixer is operating near the liquid surface.

While the present invention has been disclosed in connection with a preferred embodiment thereof, it should be understood that the scope of the invention is defined by the following claims.

What is claimed is:

1. A device to limit the amount of air intake into a submersible mixer being mounted on a frame for operating beneath a liquid surface, the mixer including a motor, a propeller mounted on the shaft of said motor, and a shroud surrounding said propeller, the device comprising:

a cover being mounted on the frame above the mixer, said cover extending forward of the propeller 0.5 to 0.7 times the propeller diameter, and rearward of the propeller about twice the propeller diameter;

said cover having a width of about twice the diameter of said propeller, and a length 2 to 3 times the diameter of said propeller; and said cover being mounted at an angle of 5 to 15 degrees and preferably 8 to 12 degrees, with respect to the axis of the propeller, such that the forward extending end of said cover is closer to the propeller axis than the rearward end of said cover.

2. The device according to claim 1 wherein said cover configuration is planar.

3. The device according to claim 1 wherein said cover configuration is curved.

* * * * *